(12) United States Patent
Liu et al.

(10) Patent No.: US 11,663,836 B2
(45) Date of Patent: May 30, 2023

(54) EYE GAZE TRACKING CALIBRATION

(71) Applicant: GM GLOBAL TECHNOLOGY OPERATIONS LLC, Detroit, MI (US)

(72) Inventors: Ke Liu, Ypsilanti, MI (US); Ron M. Hecht, Raanana (IL); Omer Tsimhoni, Bloomfield Hills, MI (US); Michael Baltaxe, Raanana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 17/321,613

(22) Filed: May 17, 2021

(65) Prior Publication Data

US 2022/0366178 A1 Nov. 17, 2022

(51) Int. Cl.
| | |
|---|---|
| G06K 9/00 | (2022.01) |
| G06V 20/59 | (2022.01) |
| G06T 7/73 | (2017.01) |
| G06T 7/55 | (2017.01) |
| G06V 20/56 | (2022.01) |
| G06V 40/19 | (2022.01) |

(52) U.S. Cl.
CPC ............ *G06V 20/597* (2022.01); *G06T 7/55* (2017.01); *G06T 7/74* (2017.01); *G06V 20/56* (2022.01); *G06V 40/19* (2022.01); *G06T 2207/20081* (2013.01); *G06T 2207/30252* (2013.01); *G06T 2207/30268* (2013.01)

(58) Field of Classification Search
CPC ...... G06V 20/597; G06V 20/56; G06V 40/19; G06T 7/55; G06T 7/74; G06T 2207/20081; G06T 2207/30252; G06T 2207/30268
See application file for complete search history.

(56) References Cited

U.S. PATENT DOCUMENTS

| | | | |
|---|---|---|---|
| 2016/0134863 A1* | 5/2016 | Horesh | H04N 17/002 348/78 |
| 2019/0278268 A1* | 9/2019 | Rezaeian | G05D 1/0061 |

* cited by examiner

*Primary Examiner* — Dhaval V Patel
(74) *Attorney, Agent, or Firm* — Cantor Colburn LLP (57) ABSTRACT

A system and method for error estimation in an eye gaze tracking system in a vehicle may include an operator monitoring system providing measured eye gaze information corresponding to an object outside the vehicle and an external object monitoring system providing theoretical eye gaze information and an error in the measured eye gaze information based upon the measured eye gaze information and the theoretical eye gaze information.

20 Claims, 7 Drawing Sheets

EYE GAZE TRACKING CALIBRATION

INTRODUCTION

This disclosure is related to an operator monitoring system, for example a motor vehicle driver monitoring system. More particularly, this disclosure relates to driver eye gaze determinations.

Eye gaze may generally refer to the direction that a driver's eyes are fixated at any given instant. Systems are known for operator eye tracking and for providing an operator eye gaze and may be used in numerous useful applications including detecting driver distraction, drowsiness, situational awareness and readiness to assume vehicle control from an automated driving mode for example.

Eye tracking systems may exhibit errors in the eye gaze information they provide. One type of error may be generally categorized as a shift or bias in the indicated gaze. It is generally desirable to reduce or eliminate errors in gaze information from eye tracking systems.

SUMMARY

In one exemplary embodiment, an apparatus for error estimation in an eye gaze tracking system in a vehicle may include an operator monitoring system providing measured eye gaze information corresponding to an object outside the vehicle, and an external object monitoring system providing theoretical eye gaze information and an error in the measured eye gaze information based upon the measured eye gaze information and the theoretical eye gaze information.

In addition to one or more of the features described herein, the theoretical eye gaze information may be determined by the external object monitoring system based upon location information corresponding to the object outside the vehicle.

In addition to one or more of the features described herein, the measured eye gaze information may include at least one of horizontal viewing angle information and vertical viewing angle information.

In addition to one or more of the features described herein, the location information may include depth of object information.

In addition to one or more of the features described herein, the location information may include object direction information.

In addition to one or more of the features described herein, the location information may include at least one of horizontal object angle information and vertical object angle information.

In addition to one or more of the features described herein, the external object monitoring system may include at least one forward looking camera.

In addition to one or more of the features described herein, the external object monitoring system may include at least one forward looking camera, and the location information may be determined based on camera image data and relative displacement of the object outside the vehicle.

In another exemplary embodiment, a method for estimating an error in an eye gaze tracking system in a vehicle may include capturing, with a forward looking camera, a first exterior image at an earlier first time and a second exterior image at a later second time. An object common to both the first and second exterior images whose image position has changed between the first exterior image and the second exterior image may be detected within each of the first and second exterior images. Respective first and second directions of the object may be determined for each of the first and second exterior images. A relative displacement of the object between the first time and the second time may be determined. A first depth of the object at the first time and a second depth of the object at the second time based on the first direction of the object, the second direction of the object, and the relative displacement of the object may be determined. A theoretical eye gaze of an operator of the vehicle looking at the object at a selected one of the first time and the second time based on the corresponding one of the first depth of the object and the second depth of the object and the corresponding one of the first direction of the object and the second direction of the object may be determined. A measured eye gaze of the operator of the vehicle looking at the object at the selected one of the first time and the second time may be received from the eye gaze tracking system. An error in the measured eye gaze of the operator based upon the measured eye gaze and the theoretical eye gaze may be determined.

In addition to one or more of the features described herein, determining the theoretical eye gaze of the operator of the vehicle looking at the object at one of the first time and the second time may be based on a separation between the operator's eyes and the forward looking camera.

In addition to one or more of the features described herein, the object may be static and determining the relative displacement of the object between the first time and the second time may be based upon displacement of the vehicle between the first time and the second time.

In addition to one or more of the features described herein, the object may be dynamic and determining the relative displacement of the object between the first time and the second time may be based upon displacement of the vehicle between the first time and the second time and displacement of the object between the first time and the second time.

In addition to one or more of the features described herein, determining the first depth of the object at the first time and the second depth of the object at the second time based on the first direction of the object, the second direction of the object, and the relative displacement of the object may include representing the relative displacement of the object as a vector and solving an injective function comprising the vector, the first direction of the object, and the second direction of the object.

In addition to one or more of the features described herein, the measured eye gaze of the operator may include at least one of a horizontal viewing angle and a vertical viewing angle.

In addition to one or more of the features described herein, the first direction of the object and the second direction of the object may each include at least one of a respective horizontal object angle and a vertical object angle.

In addition to one or more of the features described herein, the method may further include recalibrating the eye gaze tracking system based upon the determined error in the measured eye gaze of the operator.

In addition to one or more of the features described herein, determining the error may include at least one of a comparison of the measured eye gaze with the theoretical eye gaze, a statistical model, and a machine learning model.

In addition to one or more of the features described herein, the recalibration may occur each vehicle cycle.

In yet another exemplary embodiment, an apparatus for error estimation in an eye gaze tracking system in a vehicle may include an operator monitoring system providing measured eye gaze information corresponding to an object outside the vehicle, and an external object monitoring system determining location information corresponding to the object, determining theoretical eye gaze information based upon the determined location information, and determining error in the measured eye gaze based upon the determined theoretical eye gaze information. The determined error in the measured eye gaze may provide an error estimation in the eye gaze tracking system.

In addition to one or more of the features described herein, the location information may include depth of object information and object direction information.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of control modules as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

During roadway operation of a vehicle by a vehicle operator, semi-autonomously or fully-autonomously, the vehicle may be an observer in a driving scene which includes a driving environment including, for example the roadway, surrounding infrastructure, objects, signs, hazards and other vehicles sharing the roadway collectively referred to herein as objects or targets. Objects may be static, such as road signage, or dynamic, such as another vehicle traversing the roadway. An observing vehicle may be referred to herein as a host vehicle. Other vehicles sharing the roadway may be referred to herein as target vehicles. The terms driver and operator may be used interchangeably.

Figure 1:
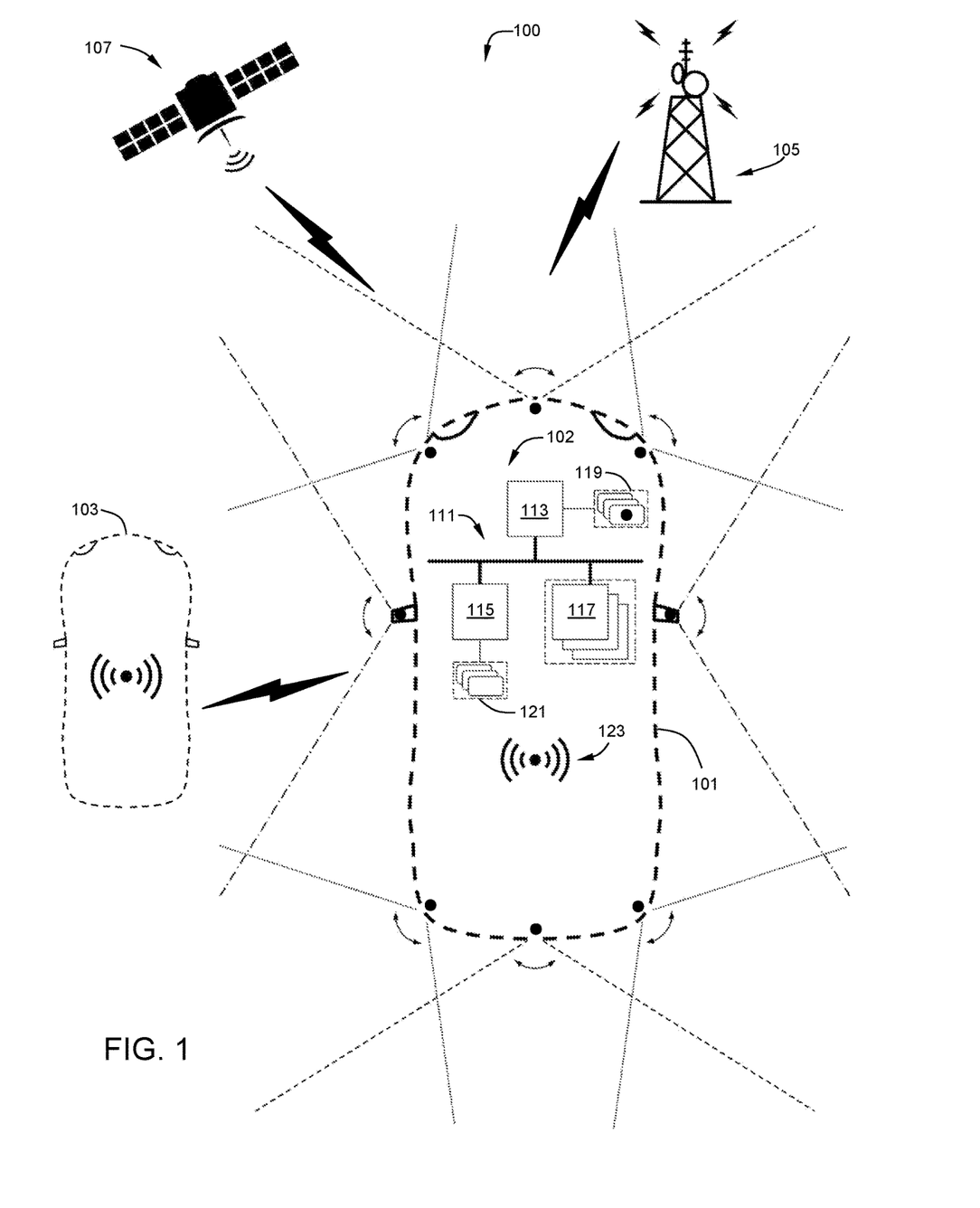
FIG. 1 illustrates an exemplary system, in accordance with the present disclosure.

A host vehicle may be equipped with various sensors and communication hardware and systems. An exemplary host vehicle 101 is shown in FIG. 1 which illustrates an exemplary system 100, in accordance with the present disclosure. Host vehicle 101 may be a non-autonomous vehicle or an autonomous or semi-autonomous vehicle. The phrase autonomous or semi-autonomous vehicle, as well as any derivative terms, broadly means any vehicle capable of automatically performing a driving-related action or function, without a driver request, and includes actions falling within levels 1-5 of the Society of Automotive Engineers (SAE) International classification system. Host vehicle 101 may include a control system 102 including a plurality of networked electronic control units (ECUs) 117 which may be communicatively coupled via a bus structure 111 to perform control functions and information sharing, including executing control routines locally or in distributed fashion. Bus structure 111 may be a part of a Controller Area Network (CAN), or other similar network, as is well known to those having ordinary skill in the art. One exemplary ECU may include an engine control module (ECM) primarily performing functions related to internal combustion engine monitoring, control and diagnostics based upon a plurality of inputs including CAN bus information. ECM inputs may be coupled directly to the ECM or may be provided to or determined within the ECM from a variety of well-known sensors, calculations, derivations, synthesis, other ECUs and sensors over the bus structure 111 as well understood by those having ordinary skill in the art. Battery electric vehicles (BEV) may include a propulsion system control module (PSCM) primarily performing BEV powertrain functions, including controlling wheel torque and electric charging and charge balancing of batteries within a battery pack. One having ordinary skill in the art recognizes that a plurality of other ECUs 117 may be part of the network of controllers onboard the host vehicle 101 and may perform other functions related to various other vehicle systems (e.g. chassis, steering, braking, transmission, communications, infotainment, etc.). A variety of vehicle related information may be commonly available and accessible to all networked ECUs over the CAN bus, for example, vehicle dynamics information such as speed, heading, steering angle, multi-axis accelerations, yaw, pitch, roll, etc. Another exemplary ECU may include an external object calculation module (EOCM) 113 primarily performing functions related to sensing the environment external to the vehicle 101 and, more particularly, related to roadway lane, pavement and object sensing. EOCM 113 receives information from a variety of external object sensors 119 and other sources. By way of example only and not of limitation, EOCM 113 may receive information from one or more radar sensors, lidar sensors, ultrasonic sensors, two-dimensional (2D) cameras, three-dimensional (3D) cameras, global positioning systems, vehicle-to-vehicle communication systems, and vehicle-to-infrastructure communication systems, as well as from on or off board databases, for example map and infrastructure databases. EOCM 113 may therefore have access to position data, range data, rate data, and image data which may be useful in the determination of roadway and target vehicle information, for example, roadway feature and target vehicle geometric, distance and velocity information, among others. Sensors 119 may be positioned at various perimeter points around the vehicle including front, rear, corners, sides etc. as shown in the vehicle 101 by large dots at those positions. Sensor 119 positioning may be selected as appropriate for providing the desired sensor coverage for particular applications. While sensors 119 are illustrated as coupled directly to EOCM 113, the inputs may be provided to EOCM 113 over the bus structure 111 as well understood by those having ordinary skill in the art. Another exemplary ECU may include a driver monitoring module (DMM) 115 tasked with monitoring the driver and/or passengers within the vehicle and primarily performing functions related to sensing the environment within the vehicle 101 and, more particularly, related to driver interaction with the vehicle, driver attentiveness, occupant posture and positioning, seatbelt restraint positioning and other features and functions within the vehicle. The DMM 115 may receive information from a variety of sensors 121 and other sources. By way of example only and not of limitation, DMM 115 may receive information from one or more two-dimensional (2D) cameras and/or three-dimensional (3D) cameras, including infrared (IR) and/or near IR cameras.

Host vehicle 101 may be equipped with wireless communication capabilities shown generally at 123 which may be capable for one or more of GPS satellite 107 communications, vehicle-to-vehicle (V2V) and vehicle-to-infrastructure (V2I) communications though known ad-hoc networking, vehicle-to-pedestrian (V2P) communication, vehicle-to-cloud (V2C) communications such as through terrestrial radio (e.g. cellular) towers 105, or vehicle-to-everything (V2X) communications. In the present disclosure, reference to V2X is understood to mean any one or more wireless communication capabilities connecting a vehicle to resources and systems off-board the vehicle including but not limited to V2V, V2I, V2P, V2C.

The description herein of the exemplary system 100 is not intended to be exhaustive. Nor is the description of the various exemplary systems to be interpreted as being wholly required. Thus, one having ordinary skill in the art will understand that some, all and additional technologies from the described exemplary system 100 may be used in various implementations in accordance with the present disclosure. One having ordinary skill in the art will appreciate that the described vehicle hardware is simply meant to illustrate some of the more relevant hardware components used with the present apparatus and methods and it is not meant to be an exact or exhaustive representation of vehicle hardware for implementing the present apparatus and methods. Furthermore, the structure or architecture of the vehicle hardware may vary substantially from that illustrated in FIG. 1 (e.g., individual ECUs may be integrated or otherwise combined with one another or with other equipment, as opposed to all being separate, stand-alone components). Because of the countless number of potential arrangements and for the sake of brevity and clarity, the vehicle hardware is described in conjunction with the illustrated embodiment of FIG. 1, but it should be appreciated that the present system and method are not limited to such embodiment.

Figure 2:
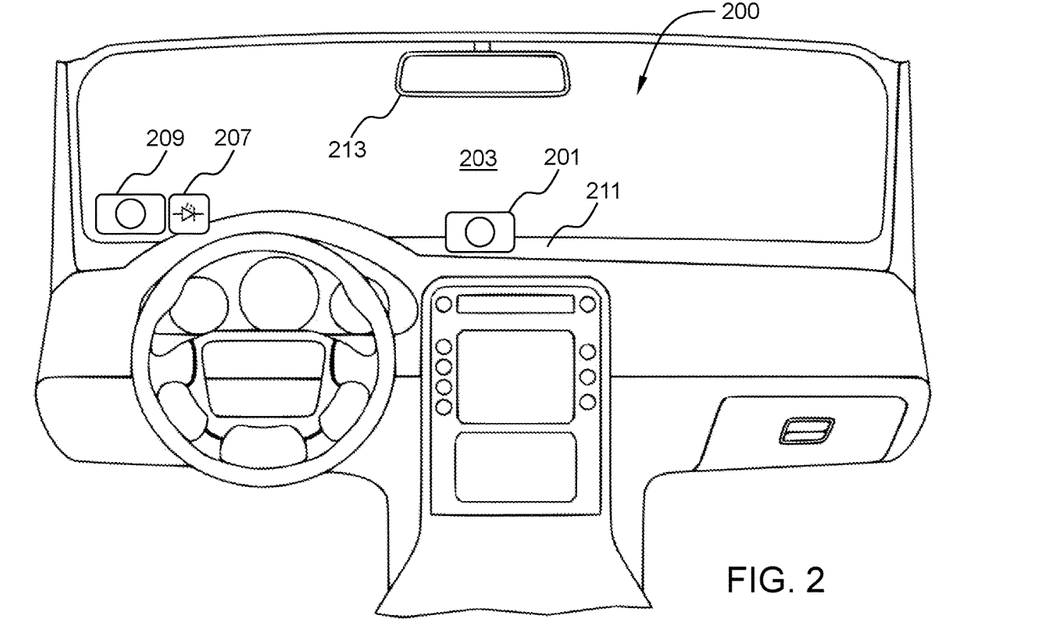
FIG. 2 illustrates a forward looking view from within the passenger compartment of a host vehicle, in accordance with the present disclosure.

FIG. 2 illustrates a forward looking view from within the passenger compartment 200 of vehicle 101. The passenger compartment 200 may include one or more forward looking cameras 201 (hereafter camera 201) configured to capture a substantially forward looking driving scene through the windshield 203. Camera 201 may be mounted on dash panel 211, on or within rear view mirror 213, beneath the passenger compartment headliner, at an A-pillar or any other location providing an unobstructed view of the forward looking driving scene. Camera 201 may alternatively be located external to the passenger compartment. Camera 201 is mounted inside of the vehicle cabin and provides the present system and method with camera image data. Although the following examples describe the camera 201 in the context of video cameras that generate corresponding images or still frames, camera 201 may include any suitable camera or vision system known or used in the industry, so long as it is capable of capturing exterior images, representations and/or other information regarding the environment outside of the vehicle. Depending on the particular application, camera 201 may include: a still camera, a video camera; a BW and/or a color camera; an analog and/or digital camera; a wide and/or narrow field-of-view (FOV) camera; and may be part of a mono and/or stereo system, to cite a few possibilities. According to a non-limiting example, the vehicle hardware includes camera 201 that is a CMOS video camera and provides camera image data to EOCM 113 directly or via the bus structure 111. Camera 201 may be a wide-angle camera (e.g., with a FOV of about 170° or more) so that a full view or nearly full view of the relevant forward driving scene may be obtained. The camera image data outputted by camera 201 may include raw video or still image data (i.e., with no or little pre-processing), or it may include pre-processed video or still image data in cases where the camera 201 has its own image processing resources and performs pre-processing on the captured images before outputting them as camera image data.

FIG. 2 further illustrates the passenger compartment 200 including one or more rear looking cameras 209 (hereafter camera 209) configured to capture, at a minimum, images of a driver's eyes. Camera 209 may be mounted on dash panel 211, on or within rear view mirror 213, beneath the passenger compartment headliner, at an A-pillar or any other location providing an unobstructed view of the driver. A light source 207 may be included as part of or separate from the camera 209. Light source 207 may preferably be an IR or near IR light source such as a light emitting diode (LED) as illustrated. According to a non-limiting example, the camera 209 provides camera image data to the DMM 115 directly or via the bus structure 111. The camera image data outputted by camera 209 may include raw video or still image data (i.e., with no or little pre-processing), or it may include pre-processed video or still image data in cases where the camera 209 has its own image processing resources and performs pre-processing on the captured images before outputting them as camera image data. The DMM 115 determines the gaze direction of the driver from known techniques. For example, one technique is known as pupil center corneal reflection which may use the light source 207 to illuminate the driver's eyes and the camera 209 to capture images of the eyes including reflections of the light from one or both eyes' corneas and pupils. A gaze direction may be determined from the reflective geometries of the corneas and pupils and additional geometric features of the reflections. The DMM 115, including known image processing algorithms (including Artificial Intelligence (AI)), the camera 209 and light source 207 together make up an exemplary eye tracking system which may provide gaze information. Alternative eye tracking systems, including alternative eye tracking techniques and algorithms, may be employed within the scope of the present disclosure. Gaze information may be represented by a vector or multiple component vectors. For example, gaze information be represented by a vector corresponding to a horizontal angle component (i.e. left/right) and a vector corresponding to an elevation angle component (i.e. up/down).

In accordance with the present disclosure, driver eye gaze may be measured and provided by an eye tracking system and is compared to a theoretical eye gaze determined based upon external object locations sensed by external sensors like cameras. Deviation of the driver's measured eye gaze from the theoretical eye gaze may be determined from such comparisons and corrected as required. As used herein, the term "comparison" may mean any evaluation of measured eye gaze in view of theoretical eye gaze and may include for example simple scalar comparisons as well as statistical modeling or machine learning methods.

Figure 3:
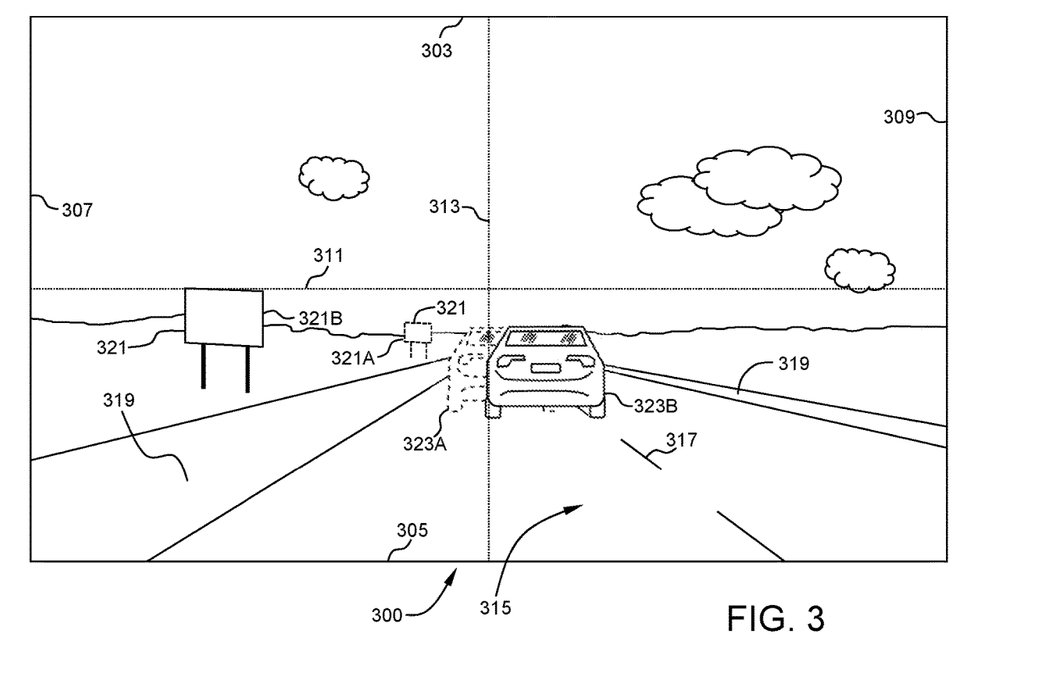
FIG. 3 illustrates an exemplary driving scene as may be captured in an exterior image by a forward looking camera as a host vehicle traverses a roadway, in accordance with the present disclosure.

FIG. 3 illustrates an exemplary driving scene 300 as may be captured in an exterior image by forward looking camera 201 as the host vehicle 101 traverses a roadway 315. Images from camera 201 may be boundary limited at a top edge 303, bottom edge 305, left edge 307 and right edge 309. Horizontal image centerline 311 and vertical image centerline 313 are orthogonal image constructs and desirably substantially correspond to horizontal directions and vertical directions with proper camera 201 orientation and calibration. Similarly, top edge 303 and bottom edge 305 desirably correspond to horizontal directions and left edge 307 and right edge 309 desirably correspond to vertical directions. The exemplary driving scene of FIG. 3 includes a two-lane road 315 with adjacent lanes being distinguished by lane markers 317. Road shoulders 319 are illustrated bounding the two-lane road 315. FIG. 3 represents the overlay of two images separated in time, for example by several seconds. Exemplary objects in the two images include a static object 321 and a dynamic object 323 which, in the present embodiment, are a road sign and preceding vehicle, respectively. The earlier captured image of static object 321 at time $t_0$ is designated 321A and the earlier captured image of dynamic object 323 at time $t_0$ is designated 323A. The later captured images of static object 321 at time $t_1$ is designated 321B and the later captured image of dynamic object 323 at time $t_1$ is designated 323B. The earlier captured images of objects 321 and 323 at time $t_0$ are illustrated in FIG. 3 with broken lines, whereas the later captured images of objects 321 and 323 at time $t_1$ are illustrated in FIG. 3 with solid lines.

Figure 4A:
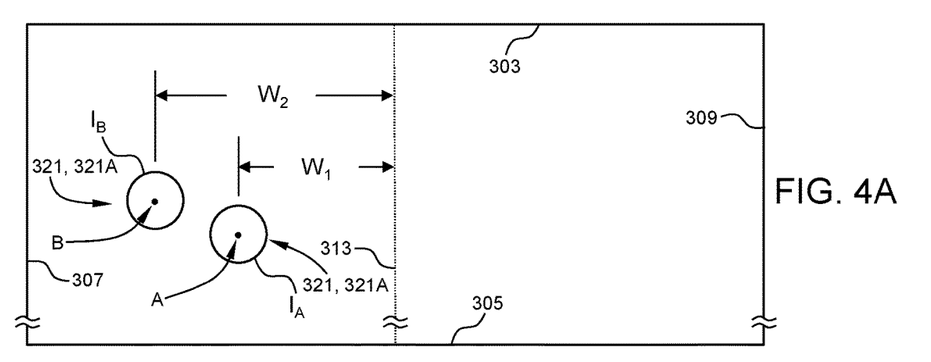
FIG. 4A illustrates a simplified representation of overlaid images with respect to a static object, in accordance with the present disclosure.
Figure 4B:
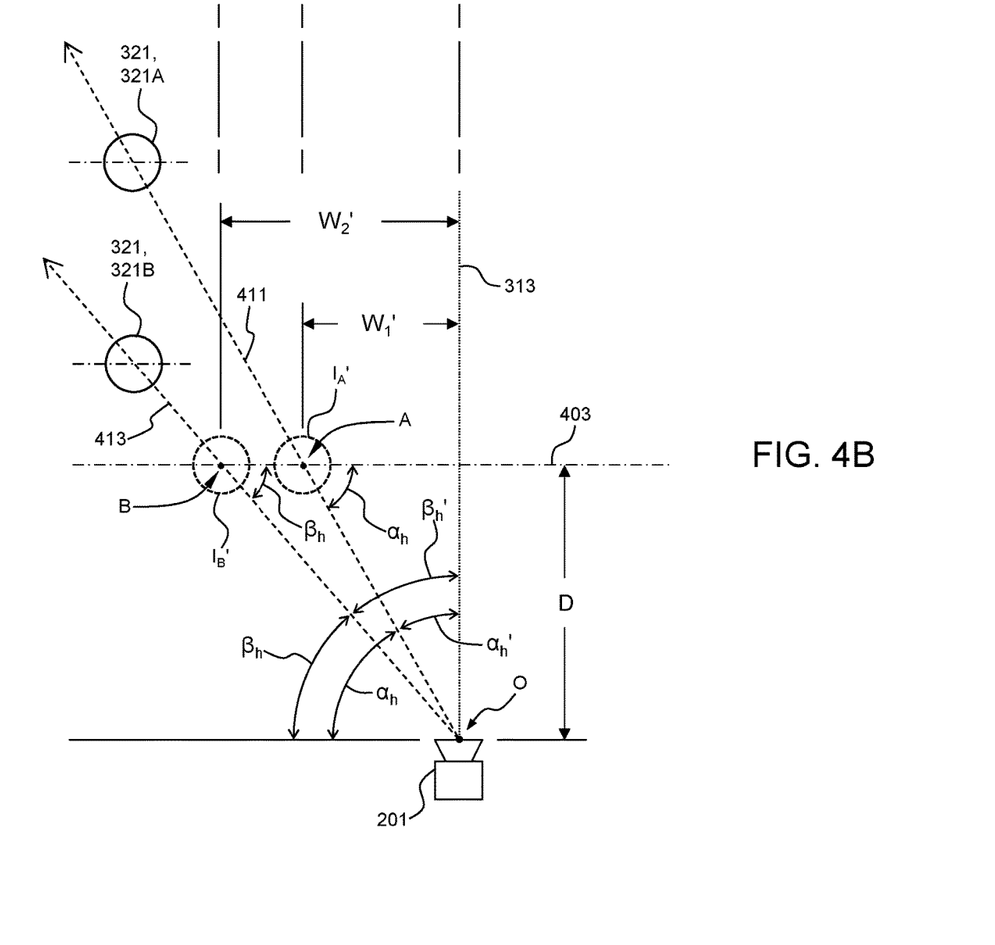
FIG. 4B illustrates a top down plan view representation of a driving environment, in accordance with the present disclosure.

FIG. 4A represents a simplified representation of the overlaid images of FIG. 3 with respect to the static object 321. In this example, the static object 321 represents any static object or target that the camera 201 and EOCM 113 may capture and process at different time stamps, for example at earlier time $t_0$ and later time $t_1$ separated by several seconds, preferably as the host vehicle 101 traverses a roadway. Time separation may be determined by such factors as vehicle speed and the relative displacement of objects between two time stamps. Processing by EOCM 113 may include, for example, image cropping, segmentation, object recognition, extraction and classification among other image processing functions as well known to those skilled in the art. Thus, earlier and later captured images of static object 321 are labeled $I_A$ and $I_B$, respectively. Top edge 303, bottom edge 305, left edge 307, right edge 309, and vertical image centerline 313 are also illustrated. Within the images captured and overlaid as described, image distances $W_1$ and $W_2$ of each of the earlier and later captured images of the static object, $I_A$ and $I_B$, may be determined. Image distances $W_1$ and $W_2$ may be scaled in pixels, for example. Image distances $W_1$ and $W_2$ may be measured from the vertical scene centerline 313. Vertical image centerline 313 may be an arbitrary anchor point or reference for determination of image distances $W_1$ and $W_2$, it being understood that other references may be utilized including left and right edges 307 and 309. Similarly, a center point may be an arbitrary point on the image of the objects for determination of image distances $W_1$ and $W_2$, it being understood that other image reference points may be utilized including edges, corners, vehicle parts such as wheels, body panels, brake lights, etc. In the present disclosure, center points are used as reference points on objects and images of objects and may be designated with labels A and B in the drawings. An image plane 403 for object projection may be arbitrarily defined at some distance forward of the camera 201 such that the image distances $W_1$ and $W_2$ may be mapped to the image plane. An exemplary image plane 403 is illustrated in FIG. 4B which is a top down plan view representation of the driving environment represented in FIG. 3 and FIG. 4A. The image plane 403 is an arbitrary distance D, for example 5 meters, from the forward looking camera 201. Vertical image centerline 313 orthogonally intersects image plane 403. Image distances $W_1$ and $W_2$ may be mapped to the image plane in accordance with a predetermined scaling factor or function to return image plane distances $W_1'$ and $W_2'$. Image plane distance $W_1'$ corresponds to the projected image $I_A'$ and image plane distance $W_2'$ corresponds to the projected image $I_B'$. From the image plane distances $W_1'$ and $W_2'$ and the distance D, the respective image plane angles $\alpha_h = \tan^{-1}(D/W_1')$ and $\beta_h = \tan^{-1}(D/W_2')$ may be determined. It is appreciated that the image plane angles illustrated are in the horizontal plane and thus are labeled with a subscripted h and may be referred to as horizontal image plane angles or horizontal object angles. It is further appreciated that the horizontal image plane angles illustrated are the complementary angles to the azimuth angles $\alpha_h'$ and $\beta_h'$ corresponding to the static object 321 at the earlier and later time stamps relative to the forward looking camera 201 origin O and vertical image centerline 313. The horizontal image plane angles $\alpha_h$ and $\beta_h$ or their complementary azimuth angles $\alpha_h'$ and $\beta_h'$ may define the direction of the static object 321 at earlier and later times $t_0$ and $t_1$, respectively. It is appreciated that the rays $\overrightarrow{OA}$ and $\overrightarrow{OB}$ represent the directions of the static object 321 at times $t_0$ and time $t_1$, respectively.

Figure 5:
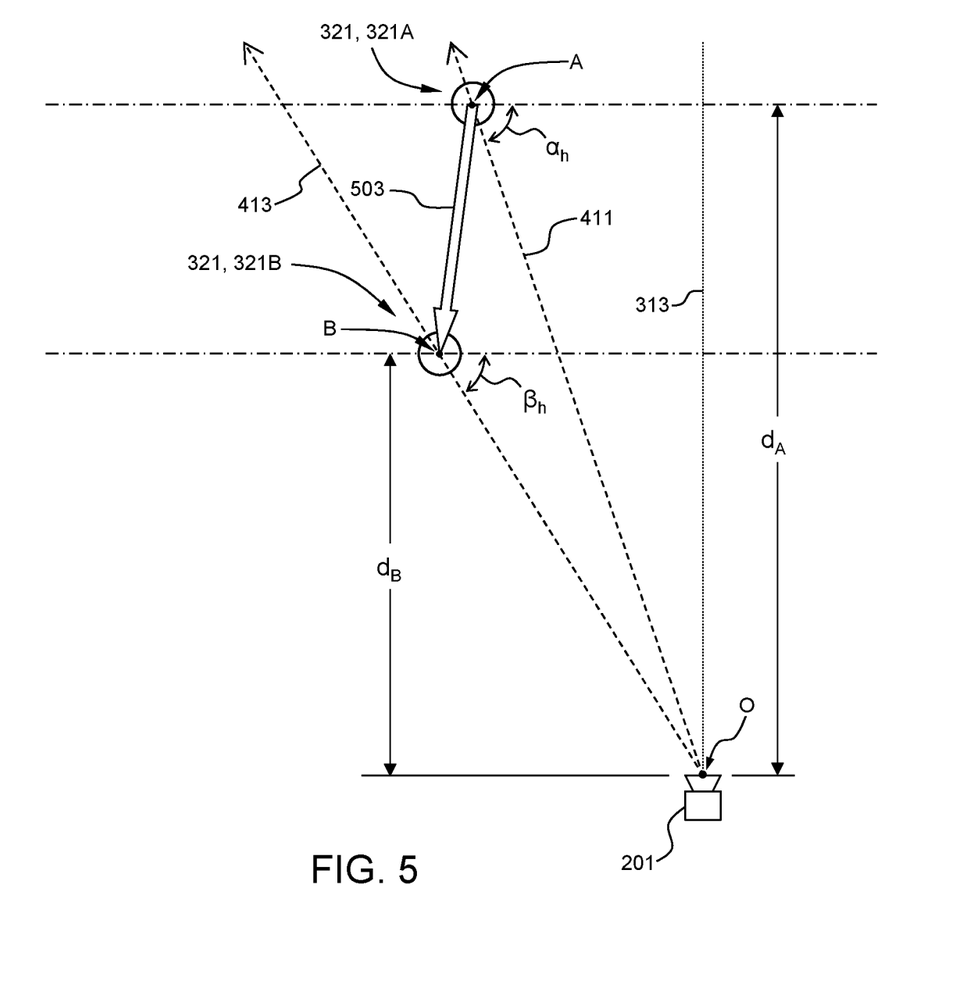
FIG. 5 illustrates determination of object depth information, in accordance with the present disclosure.

With additional reference to FIG. 5, depth of objects may be determined. The relative displacement of the static object 321 is represented by vector $\overrightarrow{AB}$ 503 which may be derived from the host vehicle displacement from its first position at time $t_0$ to its second position at time $t_1$ from CAN bus vehicle position information and kinematic information. In the case of a static object, the vector $\overrightarrow{AB}$ 503 may simply be modeled as the inverse of the host vehicle 101 displacement vector. In accordance with the present disclosure, information relating to position and motion of dynamic objects may be based upon external object sensors 119. In one embodiment, EOCM 113 may receive and derive kinematic information from external object sensors 119, including one or more of range/rate capable sensors such as radar, lidar, ultrasonic and vision sensors, that provide data directly corresponding to static and dynamic object position and time derivatives thereof. That is, position, range, velocity, acceleration and jerk of an object within the reference frame of the host vehicle 101 may be available from such range/rate capable sensors. Additionally, it is known that range/rate sensors may also provide moving object yaw rate, also within the reference frame of the host vehicle 101. External object sensors 119 preferably provide position, range, velocity, acceleration and jerk metrics in vehicle standard longitudinally (X) and laterally (Y) resolved components. Otherwise, such resolving may be performed in EOCM 113. Depending upon the degree of "at sensor" signal processing, downstream sensor processing may include various filtering. Additionally, where external object sensors 119 are numerically and/or topologically manifold, downstream sensor processing may include sensor fusing. Thus, it is appreciated that moving object kinematic information may include: longitudinal position ($V_tP_x$), velocity ($V_tV_x$) and acceleration ($V_tA_x$); lateral position ($V_tP_y$), velocity ($V_tV_y$) and acceleration ($V_tA_y$); and yaw rate ($V_t\dot{\Psi}$). Also within the reference frame of the host vehicle 101, CAN bus data from host vehicle 101 may provide host vehicle kinematic information including: host vehicle longitudinal position ($V_hP_x$), velocity ($V_hV_x$) and acceleration ($V_hA_x$); host vehicle lateral position ($V_hP_y$), velocity ($V_hV_y$) and acceleration ($V_hA_y$); and host vehicle yaw rate ($V_h\dot{\Psi}$). Vehicle roll, pitch and vertical based information may also be included.

In another embodiment, host vehicle 101 and another vehicle on the roadway may be V2X capable allowing for the transmission of relevant information from the other vehicle for receipt by the host vehicle 101 utilizing, for example, dedicated short-range communications (DSRC). Thus, the other vehicle may provide its kinematic information, including $V_tP_x$, $V_tV_x$, $V_tA_x$, $V_tP_y$, $V_tV_y$, $V_tA_y$, and $V_t\dot{\Psi}$, vis-à-vis V2X communication of the other vehicle's CAN bus data. It is appreciated, therefore, that the other vehicle's kinematic information provided will be within the reference frame of that other vehicle. One having ordinary skill in the art will recognize that V2X information transfer may be directly between vehicles or via one or more other neighboring nodes (surrounding vehicles or infrastructure) through a V2V mesh network. Similarly, one having ordinary skill in the art will recognize that V2X information transfer may be by way of V2C routed communication, which may include additional cloud resources and data enhancement and processing as well as extend the communication distance between host vehicles 101 and other vehicles.

Relative displacements of dynamic objects, such as another vehicle traversing the roadway, therefore may be derived by additionally accounting for such other vehicle kinematics from time $t_0$ to time $t_1$, which information may be derived from host vehicle external object sensors 119 or provided via V2X communications as described. A unique vector fitting solution exists for vector $\overrightarrow{AB}$ 503 within the enclosed space between the rays $\overrightarrow{OA}$ 411 and $\overrightarrow{OB}$ 413 representing the directions of the static object 321 at times $t_0$ and time $t_1$. Thus, an injective function between the vector $\overrightarrow{AB}$ 503 and the time stamped directions (i.e. rays $\overrightarrow{OA}$ 411 and $\overrightarrow{OB}$ 413) exists and may be employed to determine the static object's positions at respective times $t_0$ and $t_1$. From the objects' directions and relative displacements, the static object's depth $d_A$ from the origin O at time $t_0$ and the static object's depth $d_B$ from the origin O at time $t_1$ are therefore known. Together, an object's depth and direction information define the object's location.

Figures 6A, 6B:
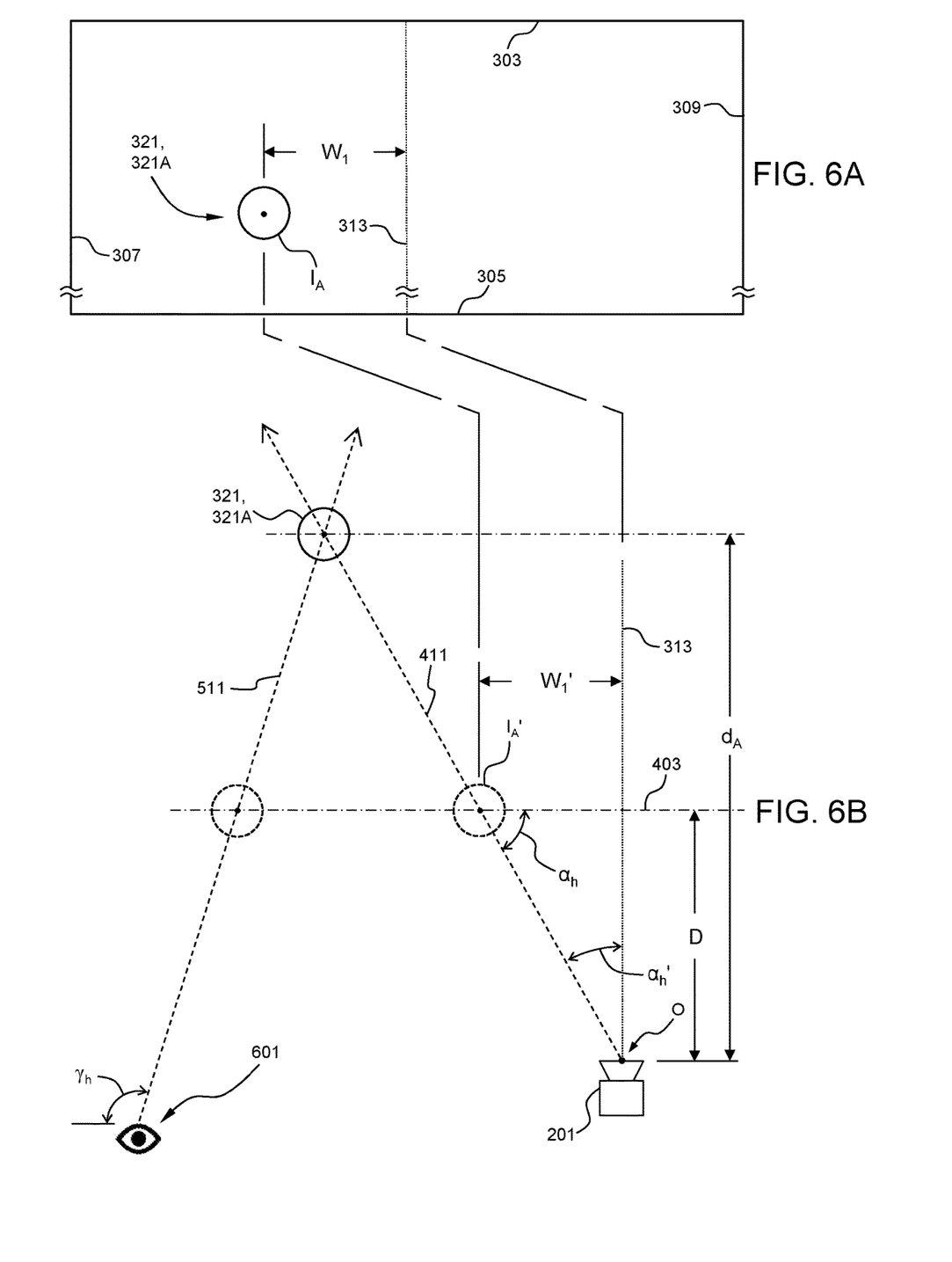
FIG. 6A illustrates a simplified representation of an image with respect to a static object, in accordance with the present disclosure.
FIG. 6B illustrates a top down plan view representation of a driving environment, in accordance with the present disclosure.

FIG. 6A corresponds to FIG. 4A but only with respect to the earlier image of static object 321 captured at time $t_0$. The exemplary image plane 403 is illustrated in FIG. 6B as it was in FIG. 4B and is also a top down plan view representation of the driving environment. FIG. 6B includes for reference static object 321 depth $d_A$, static object 321 direction (i.e. ray $\overrightarrow{OA}$ 411 and the corresponding horizontal image plane angle or horizontal object angle $\alpha_h$). In addition, FIG. 6B illustrates the driver's eyes 601. From the known depth $d_A$ and direction, and further with known driver's eyes 601 positional offset from the forward looking camera 201 origin O if desirable, a theoretical horizontal viewing angle $\gamma_h$ may be determined. It is appreciated that, alternatively, the same procedure may be followed utilizing the later image of static object 321 captured at time $t_1$.

Figures 7A, 7B:
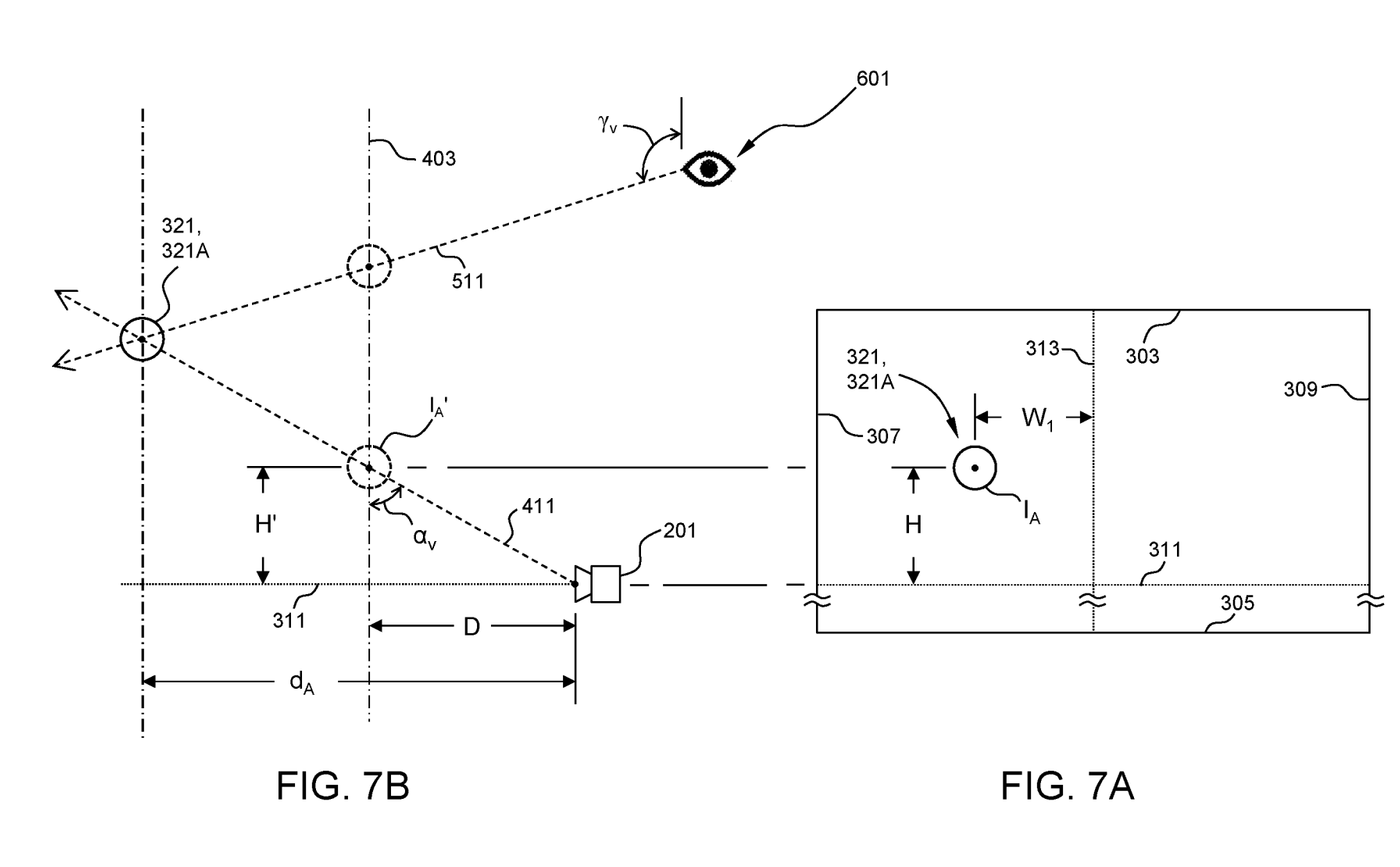
FIG. 7A illustrates a simplified representation of an image with respect to a static object, in accordance with the present disclosure.
FIG. 7B illustrates a side view representation of a driving environment, in accordance with the present disclosure.

FIG. 7A corresponds to FIG. 6A with respect to the earlier image 321B of static object 321 captured at time $t_0$. The exemplary image plane 403 is illustrated in FIG. 7B as it was in FIG. 6B; however, FIG. 7B is a side view representation of the driving environment and is instructive of a vertical analog to the horizontal representations illustrated in the top down view of FIG. 6B. FIG. 7B includes for reference static object 321 depth $d_A$, static object 321 direction (i.e. ray $\overrightarrow{OA}$ 411 and the corresponding vertical image plane angle or vertical object angle $\alpha_v$). In addition, FIG. 7B illustrates the driver's eyes 601. From the known depth $d_A$ and direction, and further with known driver's eyes 601 positional offset from the forward looking camera 201 origin O if desirable, a theoretical vertical viewing angle $\gamma_v$ may be determined. It is appreciated that, alternatively, the same procedure may be followed utilizing the later image 321B of static object 321 captured at time $t_1$.

It is to be appreciated that while a single pair of time separated images may sufficiently illustrate present subject matter, multiple such pairs of time separated images may be employed. For example, multiple pairs of images clustered around a particular pair of time stamps may beneficially be employed to effectively filter noise and disturbances (e.g. due to vehicle dynamics) from image signal information. Additionally, multiple pairs of images collected and evaluated across a wide range of gaze angles as an object is tracked by an operator may beneficially provide information as a function of gaze angle.

Figure 8:
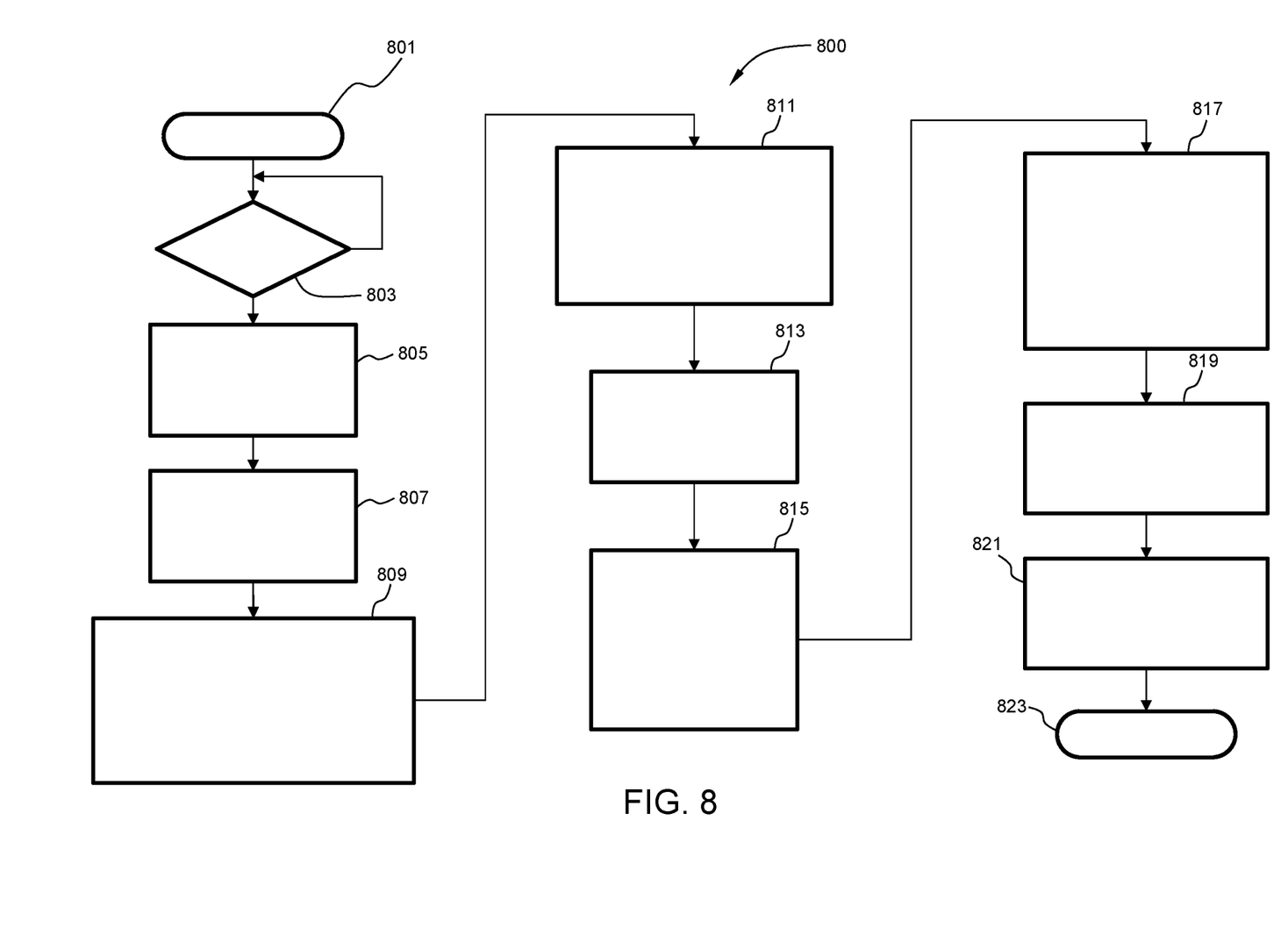
FIG. 8 illustrates an exemplary process flow for eye gaze error estimation, in accordance with the present disclosure.

FIG. 8 illustrates an exemplary process flow for eye gaze error estimation in accordance with the present disclosure. The process flow is suitable for use during active periods of eye gaze determinations by the DMM 115 (i.e. measured eye gaze). Thus, error corrections may be advantageously accomplished in real-time thus reducing the frequency of off-line calibration processes. Process 800 may be primarily implemented by EOCM 113 through execution of computer program code. However, certain steps, for example calibration requests, may require actions on the part of the vehicle 101 operator which may be interpreted through various user interfacing including, for example, interfacing with a touch screen display in the cabin of vehicle 101, through a dialogue manager or other user interface. Additionally, the various computer implemented aspects of process 800 may be executed within one or more other ECUs exclusively or in distributed fashion as previously disclosed and not necessarily limited to exclusive execution by the EOCM 113. Process 800 is illustrated as a flow diagram with individual tasks in a substantially linear routine. One skilled in the art will understand that the process described may be represented in alternative ways including state flow diagrams and activity diagrams, for example. One skilled in the art also understands that the various tasks in the process 800 flow diagram may be implemented in different orders and/or simultaneously, and consolidated or split.

Process 800 may be initiated (801) anytime the vehicle, including DMM 115 and EOCM 113, is in an operationally ready state. One or more entry conditions may be evaluated (803) to determine whether process 800 is desirable and capable. For example, a time or cycle threshold since a prior execution of process 800 may be a required entry condition, as may a manual driver calibration request for running the process 800. Process 800 may run multiple times during a drive cycle or may be more limited, for example once during each drive cycle. Entry conditions may be periodically evaluated (803) until satisfied, whereafter the process 800 may proceed to read images (805) from the forward looking camera 201. Image reading (805) may include periodically capturing images at regular or variable time stamps or extracting still images from a continuous video feed buffer including time stamp information. Object detection (807) is next performed using the captured images. Image reading (805) and object detection (807) may include image cropping, segmentation, object recognition, extraction and classification among other image processing functions. Object directions, for example horizontal and vertical image plane angles (horizontal and vertical object angles), are determined (809) for a pair of time separated images and object depths determined (811) for the same pair of time separated images. Vehicle movement and object movement during the time separation are used in the determination of relative object displacement (813). Object displacement information, object direction information and driver's eyes/camera separation information as needed are used to determine theoretical horizontal and vertical viewing angles for the driver's eyes for the object at a given timestamp (815). The DMM 115 horizontal and vertical viewing angle information for the object at the same timestamp is then provided and compared with the theoretical horizontal and vertical viewing angles (817) from which an estimated bias or error and corresponding corrections may be determined (819). Error determination may be carried out by for example by simple comparisons between the DMM 115 provided viewing angle information and the theoretical viewing angle information. Alternatively, statistical models, such as regression, may be employed using multiple incidents of DMM 115 provided information and corresponding theoretical information. Multiple incidents may correspond to temporally clustered timestamps or more widely distributed timestamps (e.g. related to tracking an object through a wide range of viewing angles). The latter example may be particularly useful in developing dynamic error behaviors where errors may vary with viewing angle, for example. Another error determination technique may include machine learning which may be employed on vehicle, off vehicle via cloud or data center backroom processing, or a combination thereof. The corrections may then be provided to the DMM 115 for recalibration (821). The current iteration of process 800 then ends (823).

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus for error estimation in an eye gaze tracking system in a vehicle, comprising:
    an operator monitoring system providing measured eye gaze information corresponding to an object outside the vehicle; and
    an external object monitoring system providing theoretical eye gaze information and an error in the measured eye gaze information based upon the measured eye gaze information and the theoretical eye gaze information;
    wherein the theoretical eye gaze information is determined by the external object monitoring system, the external object monitoring system;
        determining a first direction of the object at an earlier first time and a second direction of the object at a later second time;
        determining a relative displacement of the object between the first time and the second time;

determining a first depth of the object at the first time and a second depth of the object at the second time based on the first direction of the object, the second direction of the object, and the relative displacement of the object; and determining the theoretical eye gaze information at a selected one of the first time and the second time based on the corresponding one of the first depth of the object and the second depth of the object and the corresponding one of the first direction of the object and the second direction of the object.

2. The apparatus of claim 1, wherein the measured eye gaze information comprises at least one of horizontal viewing angle information and vertical viewing angle information.

3. The apparatus of claim 1, wherein the external object monitoring system comprises at least one forward looking camera.

4. A method for estimating an error in an eye gaze tracking system in a vehicle, comprising:

capturing, with a forward looking camera, a first exterior image at an earlier first time and a second exterior image at a later second time;

detecting within each of the first and second exterior images an object common to both the first and second exterior images whose image position has changed between the first exterior image and the second exterior image;

determining for each of the first and second exterior images respective first and second directions of the object;

determining a relative displacement of the object between the first time and the second time;

determining a first depth of the object at the first time and a second depth of the object at the second time based on the first direction of the object, the second direction of the object, and the relative displacement of the object;

determining a theoretical eye gaze of an operator of the vehicle looking at the object at a selected one of the first time and the second time based on the corresponding one of the first depth of the object and the second depth of the object and the corresponding one of the first direction of the object and the second direction of the object;

receiving from the eye gaze tracking system a measured eye gaze of the operator of the vehicle looking at the object at the selected one of the first time and the second time; and determining an error in the measured eye gaze of the operator based upon the measured eye gaze and the theoretical eye gaze.

5. The method of claim 4, wherein determining the theoretical eye gaze of the operator of the vehicle looking at the object at one of the first time and the second time is further based on a separation between the operator's eyes and the forward looking camera.

6. The method of claim 4, wherein the object is static and determining the relative displacement of the object between the first time and the second time is based upon displacement of the vehicle between the first time and the second time.

7. The method of claim 4, wherein the object is dynamic and determining the relative displacement of the object between the first time and the second time is based upon displacement of the vehicle between the first time and the second time and displacement of the object between the first time and the second time.

8. The method of claim 4, wherein determining the first depth of the object at the first time and the second depth of the object at the second time based on the first direction of the object, the second direction of the object, and the relative displacement of the object comprises representing the relative displacement of the object as a vector and solving an injective function comprising the vector, the first direction of the object, and the second direction of the object.

9. The method of claim 4, wherein the measured eye gaze of the operator comprises at least one of a horizontal viewing angle and a vertical viewing angle.

10. The method of claim 4, wherein the first direction of the object and the second direction of the object each comprise at least one of a respective horizontal object angle and a vertical object angle.

11. The method of claim 4, further comprising recalibrating the eye gaze tracking system based upon the determined error in the measured eye gaze of the operator.

12. The method of claim 4, wherein determining the error comprises at least one of a comparison of the measured eye gaze with the theoretical eye gaze, a statistical model, and a machine learning model.

13. The method of claim 11, wherein the recalibration occurs each vehicle cycle.

14. An apparatus for error estimation in an eye gaze tracking system in a vehicle, comprising:

an operator monitoring system providing measured eye gaze information corresponding to an object outside the vehicle; and an external object monitoring system;

determining a first direction of the object at an earlier first time and a second direction of the object at a later second time, determining a relative displacement of the object between the first time and the second time, determining a first depth of the object at the first time and a second depth of the object at the second time based on the first direction of the object, the second direction of the object, and the relative displacement of the object, determining theoretical eye gaze information at a selected one of the first time and the second time based on the corresponding one of the first depth of the object and the second depth of the object and the corresponding one of the first direction of the object and the second direction of the object, and determining error in the measured eye gaze based upon the measured eye gaze information and the determined theoretical eye gaze information;

wherein the determined error in the measured eye gaze provides an error estimation in the eye gaze tracking system.

15. The apparatus of claim 14, wherein the measured eye gaze information comprises at least one of horizontal viewing angle information and vertical viewing angle information.

16. The apparatus of claim 14, wherein the external object monitoring system comprises at least one forward looking camera.

17. The method of claim 1, wherein the object is static and determining the relative displacement of the object between the first time and the second time is based upon displacement of the vehicle between the first time and the second time.

18. The method of claim 1, wherein the object is dynamic and determining the relative displacement of the object between the first time and the second time is based upon displacement of the vehicle between the first time and the second time and displacement of the object between the first time and the second time.

19. The method of claim 1, wherein determining the first depth of the object at the first time and the second depth of the object at the second time based on the first direction of the object, the second direction of the object, and the relative displacement of the object comprises representing the relative displacement of the object as a vector and solving an injective function comprising the vector, the first direction of the object, and the second direction of the object.

20. The method of claim 14, wherein determining the first depth of the object at the first time and the second depth of the object at the second time based on the first direction of the object, the second direction of the object, and the relative displacement of the object comprises representing the relative displacement of the object as a vector and solving an injective function comprising the vector, the first direction of the object, and the second direction of the object.

\* \* \* \* \*